Figure 1:
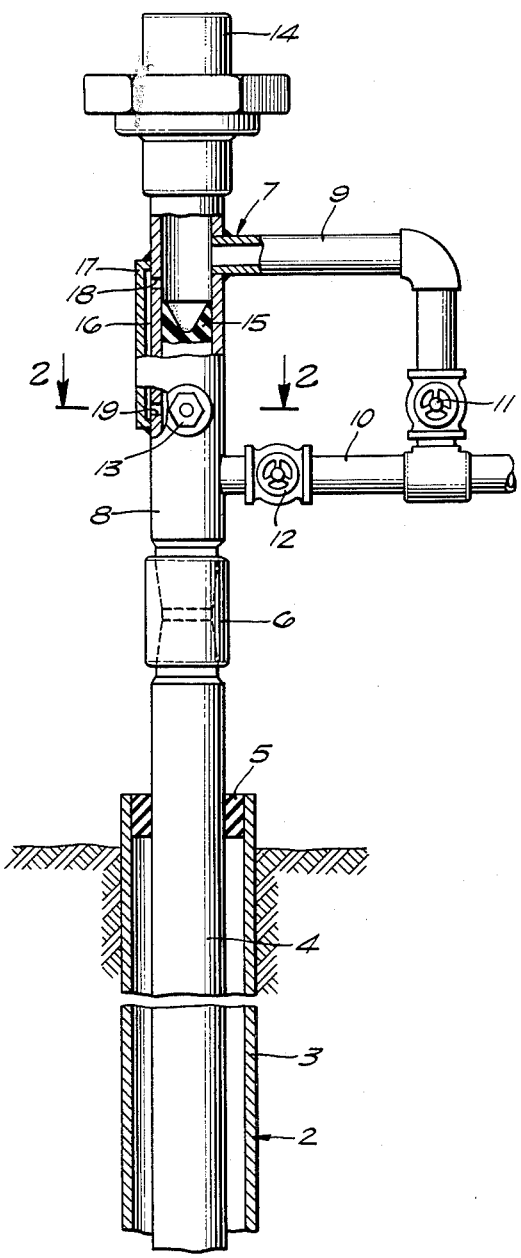

May 16, 1961 — L. B. SCOTT — 2,984,301
HYDRAULIC RELEASABLE LATCH PIN
Filed April 11, 1957

INVENTOR.
LYLE B. SCOTT
BY Allen E. Hambly
ATTORNEY

United States Patent Office 2,984,301
Patented May 16, 1961

2,984,301

HYDRAULIC RELEASABLE LATCH PIN

Lyle B. Scott, South Gate, Calif., assignor to BJ Service, Inc., Long Beach, Calif., a corporation of Delaware Filed Apr. 11, 1957, Ser. No. 652,203

15 Claims. (Cl. 166—70)

The present invention relates to an hydraulically operated retaining device, and more particularly to such a device adapted to be installed in a "lubricator" at the head of an oil or gas well into which fluid is being injected, so as to releasably control the depositing in the fluid stream of a tool or other device for travel down into the well through the well tubing.

In the copending application of M. B. Riordan, Jr., Serial No. 616,223, filed October 16, 1956, there is disclosed a well treating method, together with apparatus for performing the method. This apparatus, in one of its forms, requires the controlled deposition in the stream of well treating fluid of a canister or container of material capable of generating gas. In another form, this apparatus requires the controlled deposition in the stream of treating fluid of an actuator plug for operating a gas generating propellant container which is located downhole in the tubing string.

The present invention is particularly concerned with the means for controlling the deposition or injection of such a canister, plug or other element or apparatus in the stream of fluid flowing through the lubricator at the well head, without necessitating interruption of the flow of fluid.

Manually operated release pins have been employed for this purpose, but frequently such manually operated pins require a great deal of effort on the part of the operator because of the relatively high pressures imposed upon the pin by the canister or element to be released by the pin. Such high pressures are attributable to the fact that the canister or element to be released is subjected to injection fluid pressure to insure its being ejected from the lubricator into the stream of fluid flowing down the tubing.

A primary object of the invention is to provide a novel means for releasably maintaining a canister, plug or other tool, device or element in a well lubricator, said means including a shiftable pin adapted to span the opening through the lubricator, and treating-fluid-pressure operated means for shifting the pin to and from a retracted position.

Another object is to provide a fluid-pressure operated pin device as aforesaid including a cylinder or pressure chamber, a piston shiftably disposed for axial movements in said chamber and a pin extending axially from one side of the piston and through an end of the cylinder, means for admitting fluid into the cylinder behind the piston to shift the piston in one direction, and a relief valve in the cylinder for exhausting such fluid pressure, whereby the piston and pin are free to shift in the other direction.

Specifically, it is an object to provide a fluid-pressure operated device for use in a fluid conduit, including means mounted on the conduit and defining a pressure cylinder, a piston disposed in said cylinder, a pin on one end of the piston and projecting through one end of the cylinder, said pin being of such a length as to project into the conduit when the piston is at said end of the cylinder and to be retracted from the conduit when the piston is at the other end of the cylinder, said pin and piston having a passage therethrough for allowing the flow of fluid from the conduit into the cylinder, a relief valve in said cylinder for exhausting pressure therefrom, and said piston and pin having differential end areas, whereby when said valve is open, pressure on the pin end area will shift the pin and piston in one direction, and when the valve is closed, pressure on the piston end area will shift the piston and pin in the other direction.

Still another object is to provide a fluid-pressure-operated device as aforesaid, wherein the conduit is provided with a by-pass to enable the flow of fluid past any object held in the conduit by the pin, so as to prevent the build-up of excessive pressures on such object as might otherwise cause binding of or damage to the pin.

Other objects and advantages of the invention will be hereinafter described in connection with the illustrative embodiment shown in the accompanying drawing, and the novel features thereof will be defined in the appended claims.

Figure 2:
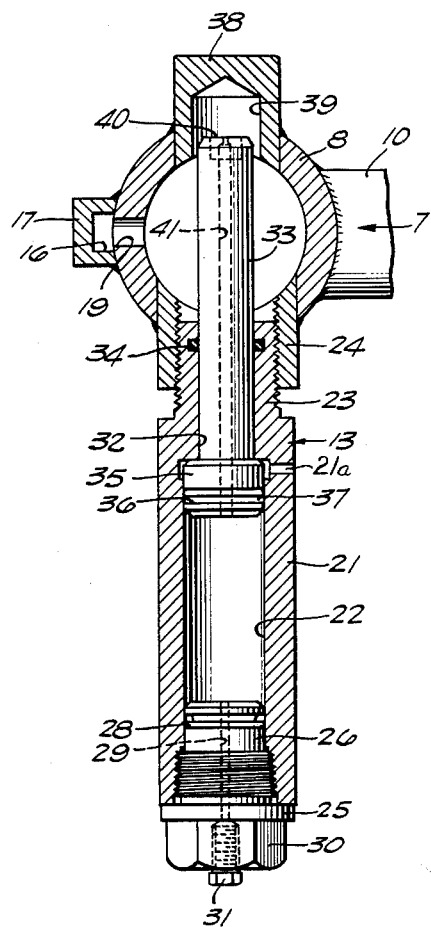

In the drawing:

Fig. 1 is a fragmentary view in elevation, with certain of the parts broken away and shown in section, depicting well head apparatus including a releasable pin device made in accordance with the invention; and Fig. 2 is an enlarged detail view in section, as taken on the line 2—2 of Fig. 1, showing the releasable pin and fluid pressure responsive operating means therefor.

Referring to Fig. 1. A well 2 is shown having a casing 3 extending into the earth. Disposed in the casing 3 is a tube 4 which is supported by suitable well head equipment diagrammatically illustrated at 5. Connected to the upper end of the tube 4 as by means of a coupling 6 is a lubricator generally designated 7. This lubricator includes a vertically extended main conduit 8. Interconnected with the main conduit 8 is a pair of feeder conduits 9 and 10 constituting a valve manifold having a valve 11 in the line 9 and a valve 12 in the line 10. Under the control of the valves 11 and 12, fluid under pressure may be injected into the main conduit 8 and thence into the well tubing 4 selectively through either of the feeder lines or conduits 9 and 10 at points spaced axially of the main conduit 8.

Interposed in the main conduit 8 between the feeder conduits 9 and 10 is a hydraulically controlled retaining pin device generally designated 13. At the top of the main conduit 8, it is provided with a removable closure 14 adapted to enable insertion into the conduit 8 of a plug such as is generally indicated at 15, or any other type of device such as a propellant containing canister as aforementioned or other tool, the passage of which down through the tubing 4 may be controlled by the hydraulically controlled device 13 in a manner which will hereinafter become more fully apparent.

In order to prevent the excessive build-up of pressure above the plug 15 or other device when retained in the conduit 8 by the retaining device 13, the conduit 8 is preferably provided with a by-pass passage 15 defined between the outer periphery of the conduit 8 and a shell 17 secured to the conduit 8 as by welding or the like. The conduit 8 is provided with a pair of axially spaced ports 18 and 19 communicating with the by-pass passage 16, the port 18 being disposed at a point substantially above the retaining device 13 and the port 19 being located at a point where it will communicate with the by-pass passage 16 and the conduit 8 beneath the plug 15 or other tool or device retained in the conduit by the retaining means 13.

The retaining device 13 is shown in detail in Fig. 2 and comprises a body 21 having an internal bore 22 providing a piston chamber or cylinder therein. At one end of the body 21, it is provided with a threaded neck portion 23 adapted to be mounted in an internally threaded adapter sleeve 24 which is welded in an appropriate opening in the side wall of the main conduit 8. It is to be understood, however, that any desired means may be employed for coupling the body 21 to the conduit 8, and the threaded joint herein shown is merely illustrative.

At the free end of the body 21, it is counter-bored and tapped to receive a closure plug 25, this plug 25 having a cylindrical axial extenison 26 closely fitting within the piston chamber or cylinder 22. About the outer periphery of the extension 26, it is provided with an annular groove or seat 27 in which is disposed an O ring seal 28 adapted to engage the inner periphery of the piston chamber or cylinder 22 to prevent leakage of fluid from the piston chamber or cylinder past the closure plug 25. In addition, the closure plug 25 is provided with an axial bleed passage 29 therethrough and the head 30 of the plug 25 is preferably counter-bored and tapped to receive a screw or bleed valve 31, whereby the bleed passage 29 may be selectively opened or closed to allow the passage of fluid from the piston chamber or cylinder 22 therethrough or to retain fluid within the piston chamber or cylinder.

The neck 23 of the body 21 is provided with an axially extended opening 32 therethrough in which is slideably mounted for reciprocation an elongated pin or stem 33. Preferably, an O ring seal 34 is interposed between the pin or stem 33 and the wall of the opening 32 to prevent the passage of fluid along the stem 33 and through the opening 32. In should be noted that the pin 33 is of such a length relative to the cylinder 21 that retraction of the pin 33 will not break the seal afforded by the sealing means 34.

At one end of the stem 33, it is provided with an enlarged head 35 constituting a piston which is reciprocably disposed in the piston chamber or cylinder 22. The piston head 35 is preferably so formed as to closely fit within the cylinder or piston chamber 22, and in order to prevent the passage of fluid past the piston head, it is provided with an annular groove 36 in its outer periphery in which is seated a resilient O ring 36 constituting a piston ring. When the pin or stem 33 and the piston head 35 are in the position shown in Fig. 2; that is, at the limit of their movement in a direction towards the conduit 8, the pin or stem 33 will project into the passage through the conduit 8; and preferably the pin or stem is of such a length as to completely traverse such passage in the conduit 8. Accordingly, in diametrically opposed relation to the adapter sleeve 24, the conduit 8 is also provided with an insert 38 which is welded or otherwise suitably secured in an aperture in the side wall of the conduit 8. This insert 38 is provided with a socket 39 into which the free extremity 40 of the pin or stem 33 is adapted to project. It will be observed that a clearance is provided between the free extremity of the pin or stem 33 and the socket 39 so that fluid may freely flow into the socket 39.

In view of the fact that the pin 33 and the piston head 35 thereon are both sealed with relation to the mounting portion 23 and the cylinder portion 21 of the body of the device, the cylinder 21 is provided with a breather port 21a, whereby the zone intermediate seals 34 and 37 communicates with atmosphere. Thus, the piston head will not be forced to pull a vacuum when the pin is being retracted, and air entrapped between the seals may be readily expelled, thereby substantially enhancing the effectiveness and life of the seals 34 and 37.

Extending axially through the pin or stem 33 and the piston head 35 is a passage or port 41, this port establishing continuous fluid communication between the conduit 8 and the piston chamber or cylinder 22. Accordingly, as long as fluid under pressure is being injected into the well tubing 4 through the conduit 8, through either the feeder line 9 or the feeder line 10 or both, as the case may be, and the valve 31 is closed, such fluid will maintain pressure within the piston chamber or cylinder 22 and such pressure will retain the pin or stem 33 in the position illustrated in Fig. 2, by reason of the piston head 35 having greater pressure-responsive area than the smaller free end of the pin or stem 33. However, when the bleeder valve 31 is opened, internal pressure in the piston chamber or cylinder 22 will drop so that fluid pressure in the conduit 8 will act upon the free end of the pin or stem 33, thereby forcing the pin and piston head towards the other end of the piston chamber or cylinder 22. Thus, as long as the bleeder valve 31 is closed, any object such as the plug 15 inserted into the conduit 8 through the closure 14 will be retained against downward movement beyond the retainer device 13 by engagement with the pin or stem 33. The by-pass passage 16 will prevent the application of excessive pressures upon the pin or stem 33 by the plug 15 or other device, and moreover, since the free end of the pin or stem normally projects into the socket 39 of the insert 38, substantial deformation of the pin 33 will be prevented.

In the light of the foregoing, it will be apparent that a novel and extremely simple, yet efficient, means has been provided for releasably retaining a plug, tool, or other device in a lubricator at the top of a well, such retaining device being operative responsive to the pressure of fluid being injected into the well through the lubricator. Operation of the retaining device requires very little manual effort on the part of an attendant, in that operation is effected merely by opening or closing the bleed valve 31 which may be provided with a hexagonal head as shown for engagement by a tool, or which may obviously have any desired type of operating means connected thereto.

Other changes and alterations may be resorted to without departing from the spirit of the invention as defined in the appended claims.

I claim:

1. A fluid pressure responsive device, comprising an actuator cylinder body, a mounting portion at one end of the body adapted to be mounted on a fluid conduit, said mounting portion having an opening therethrough, an elongated pin sealed in and shiftably extending through said opening and having one end disposed in said cylinder and the other end being adapted to project from said mounting portion, the end area of said pin within said cylinder being greater than the other end of said pin, said pin having a passage therethrough for establishing fluid communication between said cylinder and the conduit, a valve in said cylinder for selectively bleeding the cylinder and for trapping fluid in the cylinder, and said pin being of a length greater than said cylinder so as to be at all times sealed in said opening.

2. A fluid pressure responsive device, comprising an actuator cylinder body, a mounting portion at one end of the body adapted to be mounted on a fluid conduit, said mounting portion having an opening therethrough, an elongated pin shiftably disposed in said opening and having one end projecting into said cylinder and the other end being adapted to retractably project from said mounting portion, means for sealing said pin in said opening, the end area of said pin within said cylinder being greater than the other end of said pin, said pin having a passage therethrough for establishing fluid communication between said cylinder and the conduit, bleeder valve means in said cylinder, and said pin being longer than said cylinder to such an extent that upon retraction said pin remains sealed in said opening.

3. A fluid pressure responsive device, comprising an actuator cylinder body, a mounting portion at one end of the body adapted to be mounted on a fluid conduit, said mounting portion having an opening therethrough, an elongated pin shiftably disposed in said opening and having one end retractably projecting from said mounting portion, means for sealing said pin in said opening, the end of said pin in said cylinder having a piston head thereon slideably disposed in said cylinder, said pin and piston head having a passage therethrough for establishing fluid communication between the cylinder and the conduit, a bleeder valve in said cylinder for releasing pressure fluid from the cylinder and for trapping such fluid in the cylinder, said pin being of such a length relative to said cylinder as to remain sealed in said opening upon retraction of said pin.

4. Apparatus of the class described, comprising a fluid conduit, a body member mounted on said conduit and having a cylinder therein, an elongated pin slideably mounted in said body member and projecting into said cylinder, said pin having a piston at one end shiftably disposed in said cylinder, the other end of said pin being extended for projection into said conduit upon movement of the pin in one direction, means providing a seal between said pin and said body member intermediate said conduit and said cylinder, said pin having a passage therethrough for establishing fluid communication between said conduit and said cylinder behind said piston, whereby pressure in said conduit and said cylinder will shift the pin into the conduit, and a bleeder valve in said member for releasing fluid from said cylinder, whereby pressure in said conduit will urge the pin into the cylinder, said pin being of such a length as to remain sealed in said body upon movement of the pin into the cylinder.

5. Apparatus of the class described, comprising a fluid conduit, a body member mounted on said conduit and having a cylinder therein, an elongated pin slideably mounted in said body member and projecting into said cylinder, said pin having a piston at one end shiftably disposed in said cylinder, the other end of said pin being extended for projection into said conduit upon movement of the pin in one direction, means providing a seal between said pin and said body member intermediate said conduit and said cylinder, said pin having a passage therethrough for establishing fluid communication between said conduit and said cylinder behind said piston, whereby pressure in said conduit and said cylinder will shift the pin into the conduit, a valve in said member for releasing fluid from said cylinder, whereby pressure in said conduit will urge the pin into the cylinder, said pin being of such a length as to remain sealed in said body upon movement of the pin into the cylinder, and means defining a fluid by-pass for diverting fluid from said conduit past said pin.

6. A lubricator of the class described for connection to well tubing to control the injection of fluid into the well, comprising a main conduit adapted to be connected to well tubing for the passage of fluid into the tubing through the main conduit, a pair of feeder conduits in fluid communication with said main conduit at spaced points, valve means for selectively controlling the passage of fluid through the feeder conduits, and fluid-pressure-operated means having fluid communication with said main conduit for partially blocking said main conduit to retain a member against movement into the tubing along with the fluid flowing through the main conduit, said fluid-pressure-operated means including a retainer element shiftably mounted for movement into and out of said main conduit, and said retainer element having means responsive to the pressure of fluid in said conduit for shifting said retainer element as aforesaid.

7. A lubricator of the class described for connection to well tubing to control the injection of fluid into the well, comprising a main conduit adapted to be connected to well tubing for the passage of fluid into the tubing through the main conduit, a pair of feeder conduits in fluid communication with said main conduit at spaced points, valve means for selectively controlling the passage of fluid through the feeder conduits, and fluid-pressure-operated means having fluid communication with said main conduit for partially blocking said main conduit to retain a member against movement into the tubing along with the fluid flowing through the main conduit, said fluid-pressure-operated means including a retainer element shiftably mounted for movement into and out of said main conduit, said retainer element having means responsive to the pressure of fluid in said conduit for shifting said retainer element as aforesaid, and means defining a fluid by-pass past a member retained in said main conduit by said fluid-pressure-operated means for fluid flowing through said main conduit.

8. Apparatus as defined in claim 7, wherein said fluid-pressure-operated means includes a cylinder member carried by said main conduit, said retainer element being shiftably disposed in said cylinder member, and said means responsive to the pressure of fluid in said conduit including a pressure responsive end area on said retainer element exposed to the pressure of fluid in said conduit and a larger pressure responsive end area on said retainer element exposed to the pressure fluid in said cylinder.

9. Apparatus as defined in claim 7, wherein said fluid-pressure-operated means includes a cylinder member carried by said main conduit, said retainer element being shiftably disposed in said cylinder member, said retainer element having a passage therethrough for establishing fluid communication between said cylinder member and said main conduit.

10. Apparatus as defined in claim 7, wherein said fluid-pressure-operated means includes a cylinder member carried by said main conduit, said retainer element being shiftably disposed in said cylinder member, said retainer element having a passage therethrough for establishing fluid communication between said cylinder member and said main conduit, and said cylinder member having a valve for selectively relieving the cylinder member of pressure fluid from the main conduit and trapping such pressure fluid, said retaining element having differential end areas subjected to main conduit pressure and to cylinder pressure, whereby when said valve is closed pressure will build up in said cylinder and force the pin into the main conduit.

11. Apparatus as defined in claim 7, wherein said fluid-pressure-operated means includes a cylinder member carried by said main conduit, said retainer element being shiftably disposed in said cylinder member, said main conduit having an internal socket disposed in opposed relation to said cylinder member, and said retainer element having a free end adapted to project into said socket upon reaching the limit of its movement into the main conduit.

12. A lubricator of the class described for connection to well tubing to control the injection of fluid into the well, comprising a main conduit adapted to be connected to the well tubing for the passage of fluid into the tubing through the main conduit, a pair of feeder conduits in fluid communication with said main conduit at spaced points, valve means for selectively controlling the flow of fluid through the feeder conduits, a fluid actuator cylinder connected to said main conduit intermediate said feeder lines, a piston in said cylinder, a pin on said piston shiftable into and out of said main conduit, means for admitting fluid from said main conduit into said cylinder behind said piston for forcing said pin into the main conduit, and means for relieving said cylinder of pressure fluid whereby fluid in said main conduit will act on said pin and force the same out of the main conduit.

13. An attachment for an oil well lubricator, said attachment comprising: an elongated body having a threaded neck adapted to be connected to a fluid conduit of the lubricator, said neck having a bore therethrough, an elongated pin shiftably disposed in said opening, means for sealing said pin in said opening, said body having a piston chamber into which said pin extends, a piston head on said pin disposed in said piston chamber, said pin and piston having a fluid passage therethrough for establishing communication between said piston chamber and the lubricator conduit aforesaid, and control means for releasing fluid from said piston chamber for enabling free movement of said piston and pin in one direction, said pin being of such a length as to remain sealed in said opening upon movement of said piston and said pin to the limit in said one direction.

14. An oil well lubricator attachment as defined in claim 13, wherein said body is provided with a plug at one end of said piston chamber, and said control means includes a valve in said plug.

15. An oil well lubricator attachment as defined in claim 13, wherein said body is provided with a plug at one end of said piston chamber, said plug having a port therethrough and said control means comprises a screw valve threaded in said opening in the plug.

References Cited in the file of this patent

UNITED STATES PATENTS

| | | |
|---|---|---|
| 457,005 | McNeil | Aug. 4, 1891 |
| 2,058,069 | Dyer | Oct. 20, 1936 |
| 2,174,366 | Guiberson | Sept. 26, 1939 |
| 2,615,519 | Carr | Oct. 28, 1952 |
| 2,620,037 | McClendon | Dec. 2, 1952 |
| 2,630,179 | Brown | Mar. 3, 1953 |